United States Patent
Tsirkin

(10) Patent No.: US 10,963,407 B1
(45) Date of Patent: Mar. 30, 2021

(54) REMOTE DIRECT MEMORY ACCESS BASED NETWORKING GATEWAY

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/685,310

(22) Filed: Nov. 15, 2019

(51) Int. Cl.
  *G06F 13/28* (2006.01)
  *G06F 12/0831* (2016.01)
  *H04L 29/12* (2006.01)
  *H04L 12/66* (2006.01)
  *H04L 12/741* (2013.01)
  *H04L 29/06* (2006.01)
  *G06F 13/42* (2006.01)
  *G06F 9/455* (2018.01)

(52) U.S. Cl.
  CPC .......... *G06F 13/28* (2013.01); *G06F 9/45558* (2013.01); *G06F 12/0835* (2013.01); *G06F 13/4282* (2013.01); *H04L 12/66* (2013.01); *H04L 45/74* (2013.01); *H04L 61/6022* (2013.01); *H04L 69/22* (2013.01); *G06F 2009/45579* (2013.01); *G06F 2009/45583* (2013.01); *G06F 2009/45595* (2013.01)

(58) Field of Classification Search
  CPC .. G06F 13/28; G06F 9/45558; G06F 12/0835; G06F 2009/45579; G06F 2009/45595; G06F 2009/45583; H04L 12/66; H04L 45/74; H04L 61/6022; H04L 69/22
  See application file for complete search history.

(56) References Cited

U.S. PATENT DOCUMENTS

| 8,396,981 | B1* | 3/2013 | Lee | H04L 12/4625 709/232 |
| 9,448,830 | B2 | 9/2016 | Anderson et al. | |
| 9,448,901 | B1* | 9/2016 | Aslam | G06F 11/2097 |
| 2013/0339714 | A1* | 12/2013 | Hormuth | G06F 13/00 713/2 |
| 2014/0297775 | A1* | 10/2014 | Davda | G06F 13/28 709/212 |
| 2016/0117283 | A1* | 4/2016 | Aslam | G06F 3/067 709/212 |
| 2016/0188527 | A1* | 6/2016 | Cherian | H04L 69/22 709/212 |

(Continued)

OTHER PUBLICATIONS

E. Kissel and M. Swany, "Evaluating High Performance Data Transfer with RDMA-based Protocols in Wide-Area Networks," 2012 IEEE 14th International Conference on High Performance Computing and Communication & 2012 IEEE 9th International Conference on Embedded Software and Systems, Liverpool, pp. 802-811 (Year: 2012).*

(Continued)

*Primary Examiner* — Glenn A. Auve
(74) *Attorney, Agent, or Firm* — K&L Gates LLP

(57) ABSTRACT

A system includes a memory including a plurality of rings, an endpoint associated with a ring of the plurality of rings, and a gateway. The gateway is configured to receive a notification from the endpoint regarding a packet made available in the ring associated with the endpoint, access the ring with an RDMA read request, retrieve the packet made available in the ring, and forward the packet on an external network.

19 Claims, 8 Drawing Sheets

(56) References Cited

U.S. PATENT DOCUMENTS

2016/0342567 A1* 11/2016 Tsirkin .................. G06F 15/167
2017/0322828 A1* 11/2017 Panicker ............. G06F 9/45545
2019/0280991 A1*  9/2019 Singh .................... H04L 45/586
2019/0372866 A1* 12/2019 Ganguli .............. H04L 49/9047

OTHER PUBLICATIONS

Kevin Pedretti; "RDMA-like VirtIO Network Device for Palacios Virtual Machines"; UNM ID: 101511969; CS-591 Special Topics in Virtualization; Published May 10, 2012; (5 Pages).
Ezra Kissel; "RDMA over Ethernet in the WAN"; Internet2 Spring Member Meeting; University of Delaware; Published Apr. 23, 2012; (17 Pages).

* cited by examiner ns, and a gateway. The
REMOTE DIRECT MEMORY ACCESS BASED NETWORKING GATEWAY

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. For example, memory entries may be temporarily stored in ring buffers on a first-in-first-out basis before being copied to the memory associated with a different machine. Specifically, incoming networking traffic may be stored on a ring buffer and later copied to other memory locations.

SUMMARY

The present disclosure provides new and innovative remote direct memory access ("RDMA") based networking gateway systems and methods for using the RDMA based networking gateways. In an example, a system includes a memory including a plurality of rings, an endpoint associated with a ring of the plurality of rings, and a gateway. The gateway is configured to receive a notification from the endpoint regarding a packet made available in the ring associated with the endpoint, access the ring with an RDMA read request, retrieve the packet made available in the ring, and forward the packet on an external network.

In an example, a method includes receiving, by a gateway, a notification from an endpoint regarding a packet made available in a ring associated with an endpoint. The gateway accesses the ring with an RDMA read request and retrieves the packet made available in the ring. Additionally, the gateway forwards the packet on an external network.

In an example, a method includes receiving, by a gateway, a packet address of a packet. The gateway locates an endpoint associated with the packet based on destination address information in the packet, and issues an RDMA read request to the endpoint to retrieve the packet made available in a slot in a ring at the endpoint. The gateway also temporarily stores the packet at the gateway, and issues an RDMA write request to indicate that the slot can be reused.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
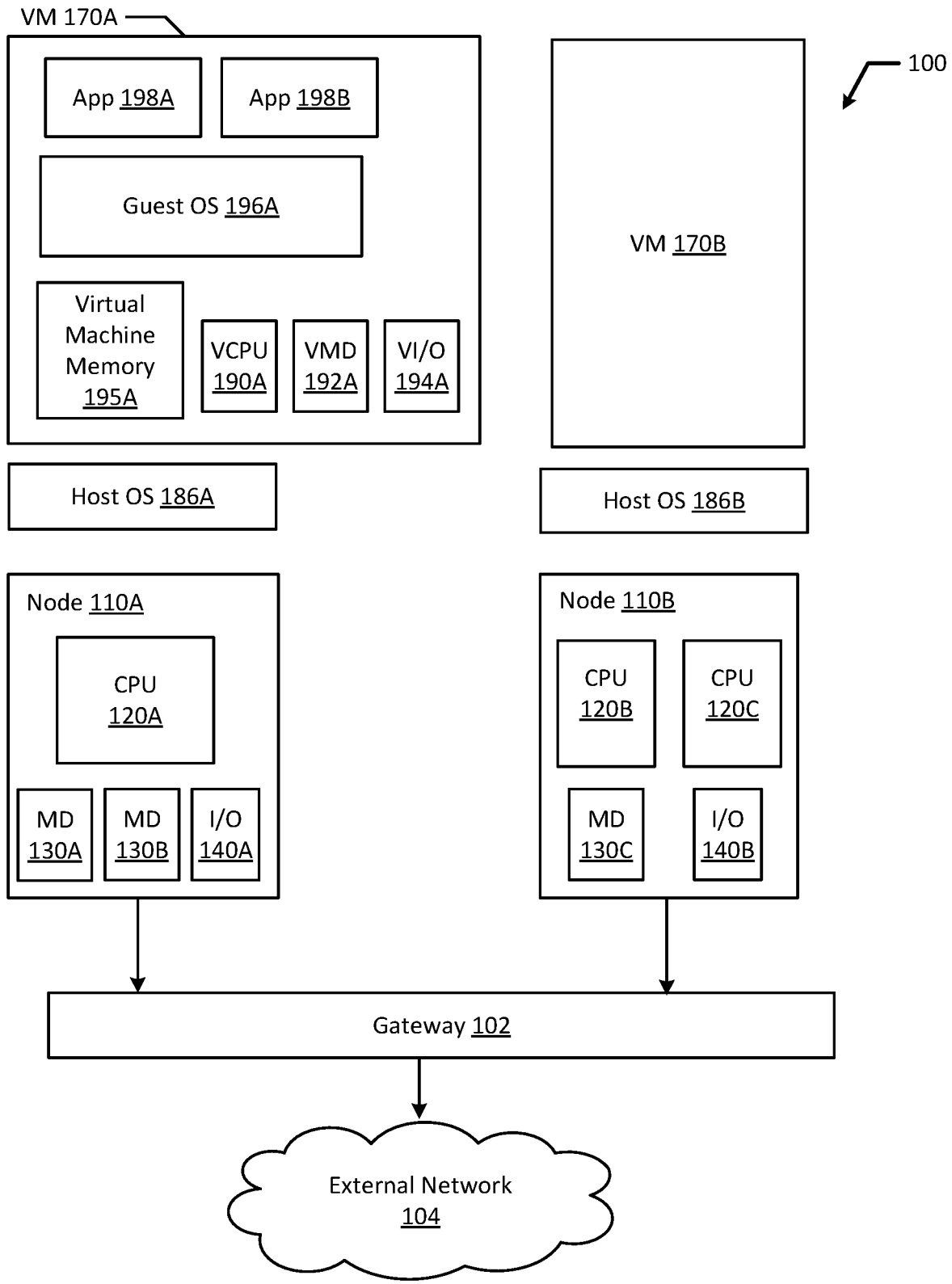
FIG. 1 illustrates a block diagram of an example computing system according to an example embodiment of the present disclosure.

Techniques are disclosed for remote direct memory access ("RDMA") based networking gateways. RDMA is a direct memory access from the memory of one computer or machine into that of another computer or machine without involving either computer's operating system. For example, RDMA offers a promise of high bandwidth and low overhead communication, which is an attractive feature for large cloud vendors. Unfortunately, parties utilizing RDMA are typically required to be RDMA-aware. Since some parties are not RDMA-aware, adopting RDMA is difficult.

The techniques disclosed herein enable a more attractive feature that includes allowing communicating parties to use Ethernet protocols with RDMA knowledge consolidated at the gateway. The data may be processed and copied from one memory location (e.g., ring buffer) to a different memory. Specifically, the techniques disclosed may be used when receiving network traffic and forwarding incoming network traffic to a virtual machine by a hypervisor, which may include receiving a packet from a network device and copying the packet to virtual machine memory. For example, each communicating party may use Ethernet communication and adopt a standard memory layout for communication such as a ring (e.g., VirtIO ring). Then, RDMA support may be provided by modifying a VirtIO driver. In an example, an endpoint stores an address of an Ethernet packet in a VirtIO ring and the contents of the ring are then sent to a gateway. The endpoints may use existing drivers (e.g., VirtIO drivers) and instead of using VM-exit and/or interrupts, the endpoints transmit SEND messages and receive SEND messages (e.g., rdma_post_send( ) message and rdma_post_recv( ) message).

A gateway may poll active rings periodically and may access available rings using an RDMA read instruction or request. Additionally, the gateway may access used rings using an RDMA write instruction or request. The gateway retrieves the packet from the available ring and later writes the packet into the used ring to notify the endpoint that the memory associated with the packet can be reused. Then, the gateway forwards the packet on an external network to another computer or machine. Furthermore, once an endpoint becomes idle, the gateway may detect that the endpoint is idle and may cease polling active rings associated with the endpoint.

Instead of requiring each communicating party to be RDMA-aware, communicating parties may use Ethernet protocols by modifying an Ethernet driver (e.g., VirtIO Ethernet driver) to support RDMA so that various endpoints can transmit data through a gateway over an external network. The systems and methods described above work with both virtual machines and containers without having to specifically program applications to communicate via RDMA. Instead, the applications can interact with a VirtIO Ethernet driver as they otherwise normally would when sending and receiving data, which allows containers and virtual machines to use RDMA transparently based on a familiar VirtIO Ethernet driver. Specifically, the systems and methods disclosed herein provide advantageous hardware utilization capabilities for large cloud vendors because virtual environments and containers may use RDMA hardware more widely.

For example, a hypervisor (e.g., Kernel-based Virtual Machine ("KVM")) on an operating system, such as Red Hat® Enterprise Linux® ("RHEL") may implement software devices and/or virtual devices. When handling network traffic (e.g., network traffic from a cloud computing platform such as the Red Hat® OpenStack® Platform), hypervisor vendors and operating system ("OS") vendors along with cloud vendors may utilize the high bandwidth and low overhead of RDMA without being RDMA-aware.

FIG. 1 depicts a high-level component diagram of an example computing system 100 in accordance with one or more aspects of the present disclosure. The computing system 100 may include various endpoints, such as nodes (e.g., nodes 110A-B), a gateway 102 and an external network 104. The computing system 100 may also include an operating system(s) (e.g., host OS 186A-B) and one or more virtual machines (VM 170A-B).

Virtual machines 170A-B may include a guest OS, guest memory, a virtual CPU (VCPU), virtual memory devices (VIVID), and virtual input/output devices (VI/O). For example, virtual machine 170A may include guest OS 196A, guest memory or virtual machine memory 195A, a virtual CPU 190A, a virtual memory device 192A, and virtual input/output device 194A. Virtual machine memory 195A may include one or more memory pages. Similarly, virtual machine 170B may include a guest OS, virtual machine memory, a virtual CPU, a virtual memory device, and virtual input/output devices.

In an example, a virtual machine 170A may execute a guest operating system 196A and run applications 198A-B which may utilize the underlying VCPU 190A, VIVID 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186A. In another example, applications 198A-B run on a virtual machine 170A may be independent of the underlying hardware and/or OS 186A. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186A. In an example, applications 198A-B run on a virtual machine 170A may be incompatible with the underlying hardware and/or OS 186A. For example, applications 198A-B run on one virtual machine 170A may be compatible with the underlying hardware and/or OS 186A while other applications run on another virtual machine 170B are incompatible with the underlying hardware and/or OS 186A. In an example, a device may be implemented as a virtual machine (e.g., virtual machine 170A-B).

Each node 110A-B may in turn include one or more physical processors (e.g., CPU 120A-C) communicatively coupled to memory devices (e.g., MD 130A-C) and input/output devices (e.g., I/O 140A-B). Each node 110A-B may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

The gateway 102 and endpoints may communicate using Ethernet communication by adopting a standard memory layout for communication that utilizes ring buffers or rings. For example, the gateway 102 and endpoints may communicate via VirtIO rings by modifying a VirtIO Ethernet driver to support RDMA communication. The endpoints, such as nodes (e.g., nodes 110A-B) or VMs 170A-B executing on the nodes, may store addresses of Ethernet packets in a VirtIO ring such that the packets may be retrieved by the gateway 102 through RDMA and forwarded on an external network.

VirtIO is an interface that allows virtual machines access to simplified virtual devices, such as block devices, network adapters and consoles. Accessing devices through VirtIO may improve performance over more traditional emulated devices because a VirtIO device typically requires minimal setup and configuration to send and receive data while a host machine handles the majority of the setup and maintenance of the actual physical hardware. VirtIO devices use one or more ring buffers or rings. The rings may include an available ring and a used ring.

The rings (e.g., VirtIO rings) may be a data structure using a single, fixed-size buffer as if it were connected end-to-end (e.g., in a ring). In an example, the ring may be a first-in-first-out (FIFO) data structure. For example, memory entries such as packet addresses may be written into and retrieved from the ring based on when the memory entry was first produced to the ring. Additionally, the rings may have a plurality of slots, which may store memory entries. In an example, rings may be stored in a memory device, and may be one of the other memory(s) illustrated in FIG. 1, such as memory device 130A-C on node 110A-B.

As used herein, physical processor or processor 120A-C, 124, and 128 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

Figure 2A:
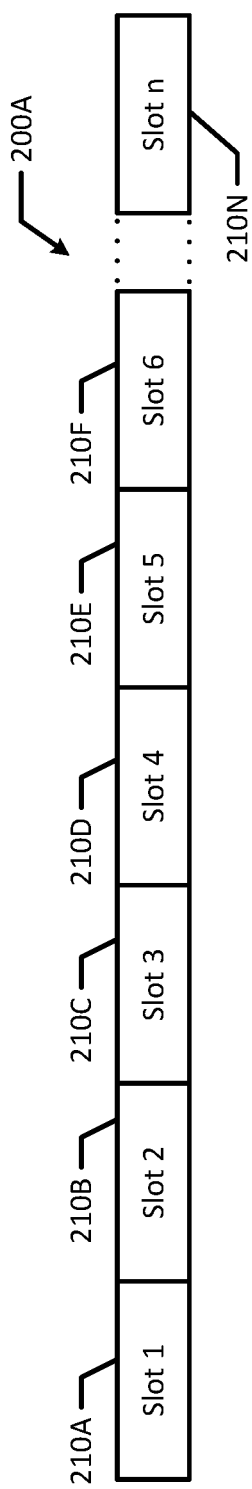
FIG. 2A illustrates a block diagram of an example memory ring according to an example embodiment of the present disclosure.
Figure 2B:
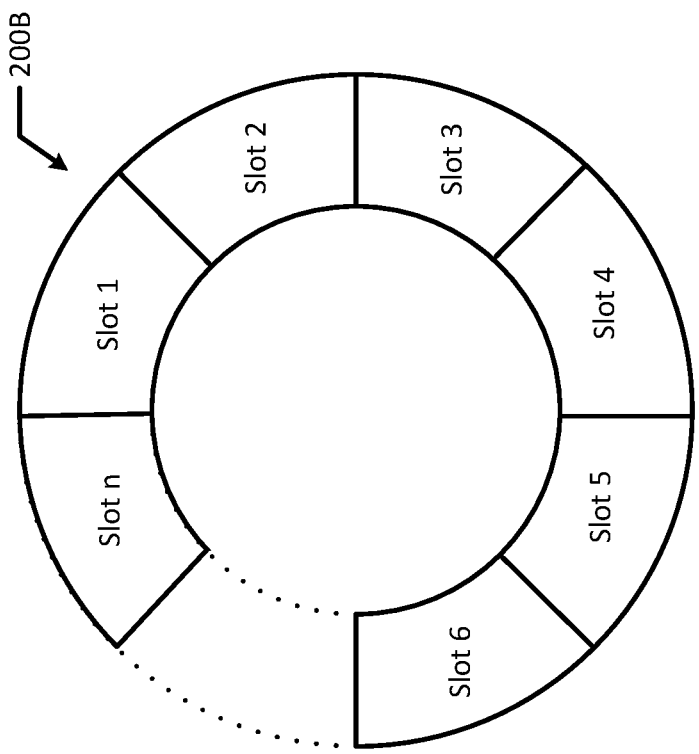
FIG. 2B illustrates a block diagram of an example memory ring according to an example embodiment of the present disclosure.

FIGS. 2A and 2B illustrate block diagrams of example ring buffers 200A and 200B (generally referred to as ring 200). For example, FIG. 2A illustrates a linear buffer implementation of ring buffer 200A while FIG. 2B illustrates the "ring" structure of ring buffer 200B. It should be appreciated that rings 200A-B may be the same actual memory structure illustrated in two different ways. Additionally, rings 200A-B may include a plurality of slots (e.g., slots 210A-N). For example, slots 210A-N may correspond to Slot 1 to Slot n respectively. Each slot may include a request or memory entry, such as a data packet, a packet address, or the like. Slots may be initially empty, include an initialization value, or may include an invalid value, such as "0". For example, a slot with a memory address of "0" may be used to indicate an empty slot or invalid slot. Conversely, a valid slot may include a request or memory entry, such as a data packet or a packet address.

Figure 3:
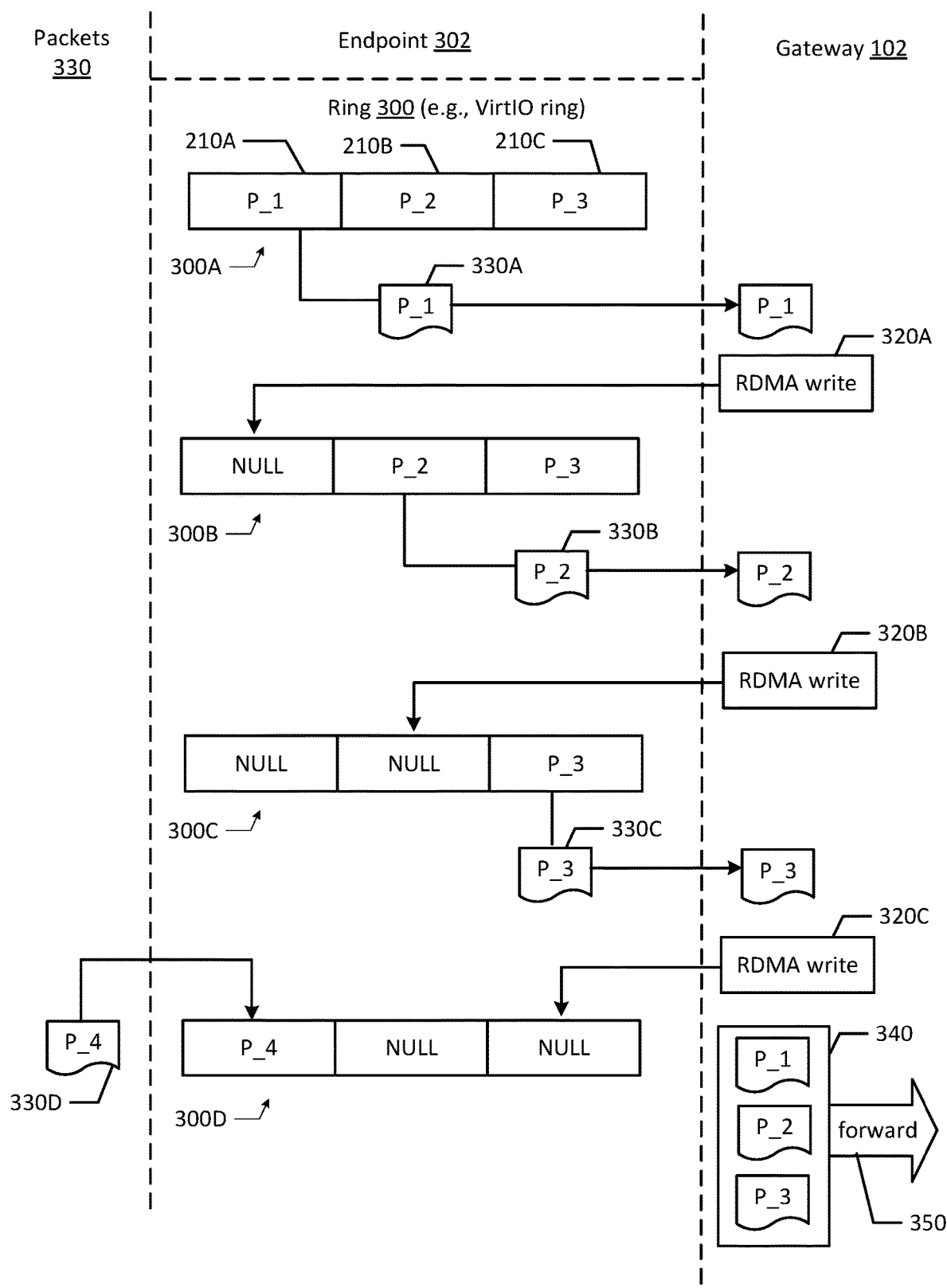
FIG. 3 illustrates a block diagram of data transmission with an example ring.

FIG. 3 illustrates a block diagram of example ring 300. The ring 300 may include slots 210A-C to store packets or packet addresses to store received requests. Additionally, slots 210A-C may store an invalid value, such as a NULL value. Memory ring 300 is illustrated as 300A-D, which represents different states of ring 300 at different points in time. In the illustrated example, ring 300 includes packet "P_1" in slot 210A, packet "P_2" in slot 210B, and packet "P_3" in slot 210C. The gateway 102 may access the ring 300 and retrieve the packet 330A (e.g., packet "P_1"). Then, the gateway 102 may perform an RDMA write instruction 320A to invalidate slot 210A to indicate that slot 210A may be reused.

Then, the gateway 102 may access the ring 300 and retrieve the packet 330B (e.g., packet "P_2"). After retrieving the packet 330B, the gateway 102 may perform an RDMA write instruction 320B to invalidate slot 210B to indicate that slot 210B may be reused. Similarly, the gateway 102 may access the ring 300 and retrieve the packet 330C (e.g., packet "P_3") and may perform an RDMA write instruction 320C to invalidate slot 210C to indicate that slot 210C may be reused.

Another packet 330D (e.g., packet "P_4") may be placed in an available slot (e.g., slot 210A) in the ring 300. For example, since slot 210A was made available again via the RDMA write instruction, additional packets may be placed in slot 210A for consumption by the gateway 102. After retrieving packets 330A-C (e.g., packets "P_1", "P_2" and "P_3"), the gateway 102 may forward the batch 340 of packets on an external network 350 (e.g., Ethernet). The gateway 102 may continue retrieving and forwarding the new packets by wrapping around the ring 300 from slot 210C to slot 210A to retrieve packet 330D.

In an example, the gateway 102 may forward packets 330 individually. For example, the gateway 102 may retrieve and/or forward packets one-by-one instead of in batches. In another example, ring 300 may instead include an available ring and a used ring. In a dual ring configuration with both an available ring and a used ring, packets may be stored in the available ring while the gateway 102 performs RDMA write instructions into the used ring to indicate that the memory may be reused.

The packets 330A-D may be written into the ring 300 by an endpoint 302. Typically, each endpoint 302 is assigned a unique MAC address. It should be appreciated that the ring depicted in FIG. 3 is for illustration purposes only, and that the ring 300 may include more than three slots. For example, the ring 300 may include a plurality of slots (e.g., in the range of 10s to 100s of slots). Each slot may occupy several bytes of memory. In an example, the rings may be configured to pass around larger amounts of data, such that the slots may hold 16 bytes, 24 bytes, etc.

Additionally, indices or pointers may indicate specific slots in ring 300. For example, a pointer may designate or indicate which slot is the next slot that the gateway 102 accesses. The pointer may be advanced to successive slots as the gateway retrieves memory entries. In an example, the pointer may be tracked by a counter. Additionally, the pointer may be maintained in a cache-line.

The gateway 102 has several capabilities. To transmit a packet (e.g., when the gateway receives a "SEND" notification from an endpoint 302), the gateway 102 issues an RDMA read request to the endpoint 302 to read the packet. The gateway 102 may also validate that the MAC address identified in the "SEND" notification matches the MAC address assigned to the endpoint 302. The gateway 102 may transmit or forward the read packet on an external network 350, such as an Ethernet network. The gateway 102 may also issue a "SEND" notification to the endpoint 302 to signal that the packet has been sent.

To receive a packet (e.g., when a gateway 102 receives a packet), the gateway 102 may locate the endpoint 302 based on a destination MAC address associated with the packet (e.g., destination MAC address identified in a packet header). Then, the gateway 102 may issue and RDMA read request to the endpoint to retrieve the packet or to retrieve the packet address to retrieve and store the packet. Then, the gateway 102 may issue and RDMA write request to the endpoint 302 to store the packet. Later, the gateway 102 may issue a "SEND" notification to the endpoint 302 to signal that a new packet has been stored.

Figure 4:
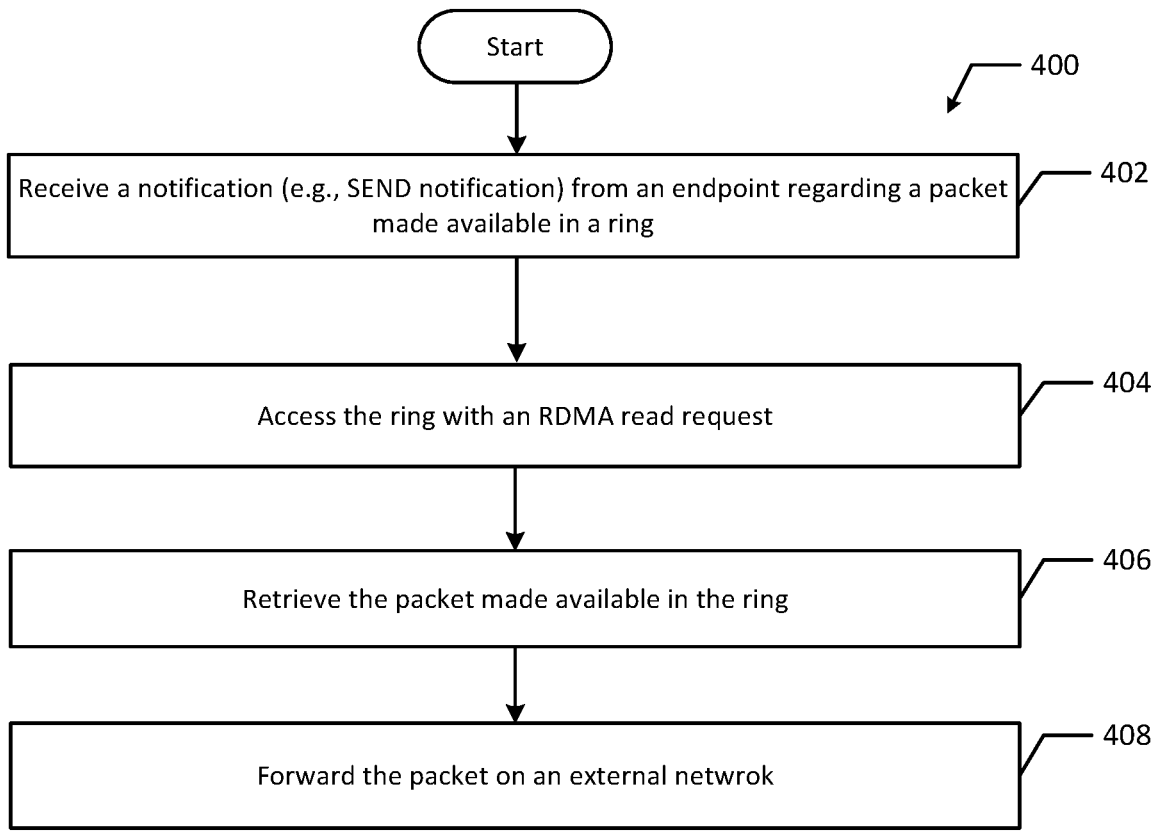
FIG. 4 illustrates a flowchart of an example process for forwarding packets on an external network through RDMA according to an example embodiment of the present disclosure.

FIG. 4 illustrates a flowchart of an example method 400 for forwarding packets on an external network through RDMA according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes receiving a notification from an endpoint regarding a packet made available in a ring (block 402). For example, a gateway 102 may receive a notification from an endpoint 302 regarding a packet (e.g., packet 330A) made available in a ring (e.g., ring 300) associated with the endpoint 302. In an example, the ring 300 may store a memory entry, such as a packet address or a data packet (e.g., packet 330A). When storing a packet address, the actual data packet (e.g., packet 330A) may be stored elsewhere, but knowledge of the packet address makes the data packet (e.g., packet 330A) available to the gateway 102. Specifically, the endpoint 302 may store memory entries such as packets or packet addresses in different slots in the ring 300 associated with the endpoint 302 (e.g., rings that the endpoint 302 initializes). In one example, the endpoint 302 may have data to send over an external network 104 and may store memory entries (e.g., that data the endpoint 302 wants to send) in an available VirtIO ring for dual ring configurations with both available VirtIO rings and used VirtIO rings.

Then, the method includes accessing the ring with an RDMA read request (block 404). For example, the gateway 102 may access the ring 300 with an RDMA read request. The gateway 102 may access the ring 300 after polling the ring 300 and detecting that a memory entry (e.g., packet 330A or packet address) is available in the ring 300.

Then, the method includes retrieving the packet made available in the ring (block 406). For example, the gateway 102 may retrieve the packet (e.g., packet 330A) made available in the ring 300. The gateway 102 may directly retrieve the packet (e.g., packet 330A) from the ring 300 if the ring 300 stores packets (e.g., packet 330A) or may retrieve the packet (e.g., packet 330A) from a packet address retrieved from the ring 300. In another example, the ring 300 may store a flag specifying that a specific packet is available as it may be common to store the actual data packet somewhere else in memory. For example, after obtaining the packet address, the gateway 102 may access the address and copy the data packet (e.g., packet 330A) from that memory location identified by the packet address.

After retrieving the packet, method 400 includes forwarding the packet on an external network (block 408). For example, the gateway 102 may forward the packet (e.g., packet 330A) on an external network 104. By using existing VirtIO drivers and instead of using VM-exit and interrupts, the endpoints 302 may transmit "SEND" messages and receive "SEND" messages to achieve RDMA data transmission on an external network 104. For example, the endpoints 302 and gateway 102 can communicate to transmit data on an external network 104 without each of the parties being RDMA-aware by using Ethernet protocols with RDMA knowledge consolidated at the gateway 102.

Figure 5:
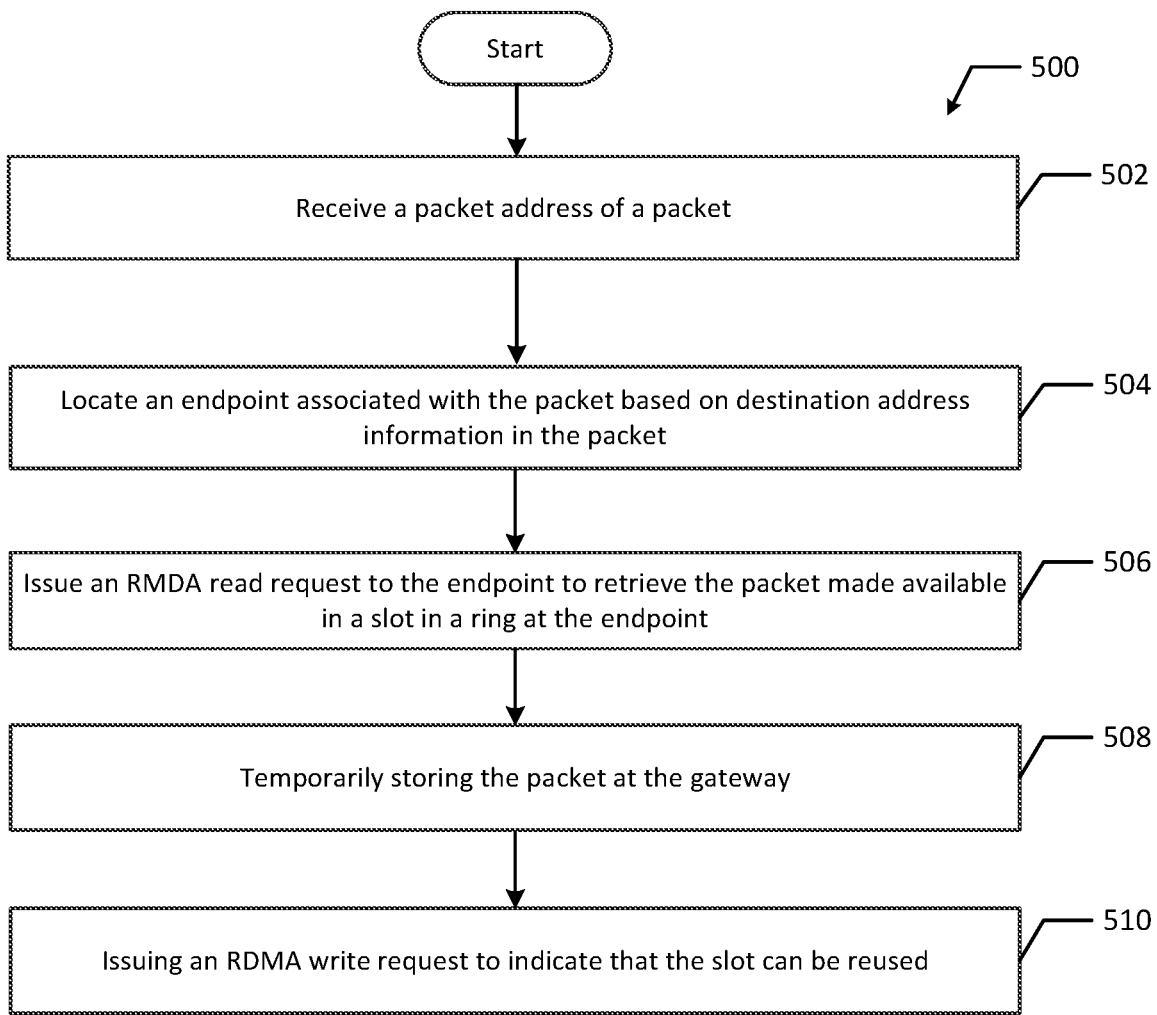
FIG. 5 illustrates a flowchart of an example process for retrieving packets and indicating memory availability using RDMA according to an example embodiment of the present disclosure.

FIG. 5 illustrates a flowchart of an example method 500 for retrieving packets and indicating memory availability using RDMA according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

The example method 500 includes receiving a packet address of a packet (block 502). For example, a gateway 102 may receive a packet address of a packet, such as an Ethernet packet. Then, the method includes locating an endpoint associated with the packet based on destination address information in the packet (block 504). For example, the gateway 102 may locate an endpoint 302 associated with the packet based on destination address information in the packet. The packet address may include a header that indicates address information, such as a MAC address of the associated endpoint 302 and the gateway 102 may validate the MAC address identified by the packet with the located endpoint 302. Additionally, method 500 includes issuing an RDMA read request to the endpoint to retrieve the packet made available in a slot in a ring at the endpoint (block 506). For example, the gateway 102 may issue an RDMA read request to the endpoint 302 to retrieve the packet made available in a slot in a ring 300 at the endpoint 302. The gateway 102 may validate the MAC address before issuing the RDMA read request to ensure that the gateway 102 is reading from the correct ring because each endpoint 302 may be associated with a single ring, but the gateway 102 may be communicating with hundreds or thousands of endpoints 302.

Then, the method includes temporarily storing the packet at the gateway (block 508). For example, the gateway 102 may temporarily store the packet at the gateway 102. Packets may be temporarily stored before being forwarded over an external network in batches or later being forwarded one-by-one. Method 500 also includes issuing an RDMA write request to indicate that the slot can be reused (block 510). For example, the gateway 102 may issue an RDMA write request to indicate that the slot can be reused. The RDMA write request may also serve as a notification that the data has been sent by the gateway 102.

Figure 6A:
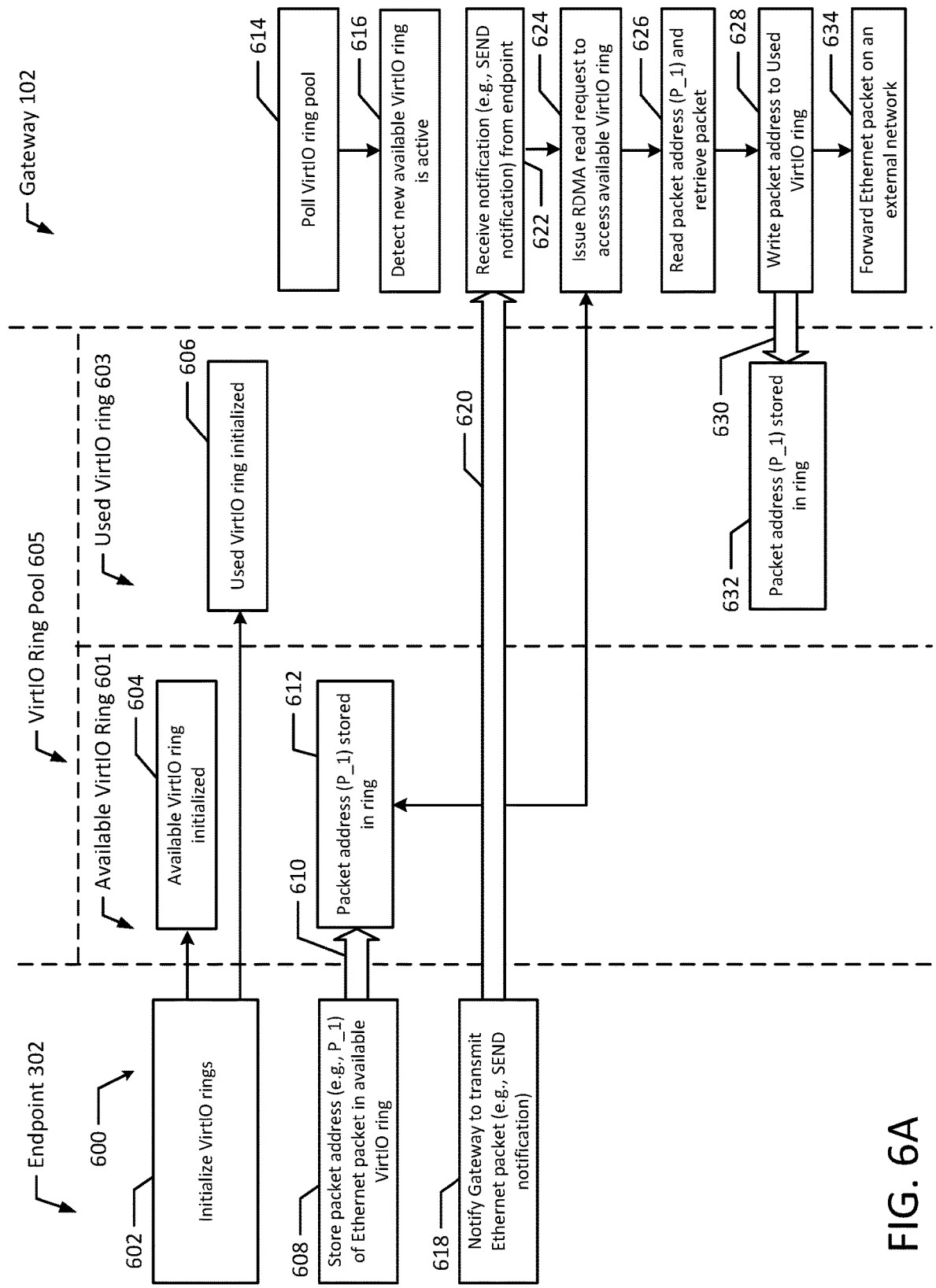
FIGS. 6A and 6B illustrate a flow diagram of an example process for forwarding packets on an external network through RDMA according to an example embodiment of the present disclosure.
Figure 6B:
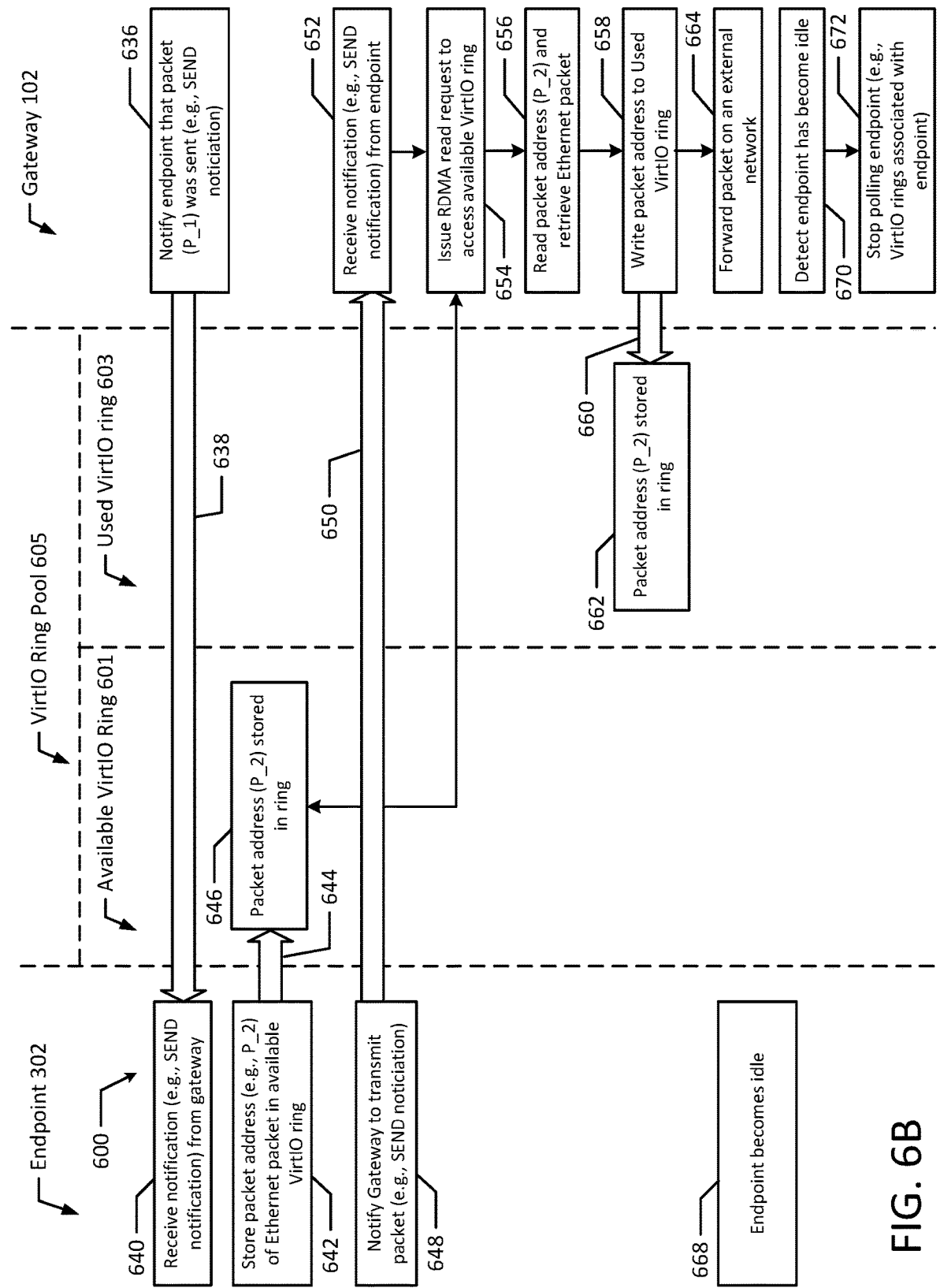

FIGS. 6A and 6B illustrate a flowchart of an example method 600 for forwarding packets on an external network through RDMA in accordance with an example of the present disclosure. Although the example method 800 is described with reference to the flowchart illustrated in FIGS. 6A and 6B it will be appreciated that many other methods of performing the acts associated with the method 600 may be used. For example, the order of some of the blocks may be changed, certain blocks may be combined with other blocks, and some of the blocks described are optional. For example, a gateway 102 and an endpoint 302 may communicate with a VirtIO ring pool 605 that includes an available VirtIO ring 601 and a used VirtIO ring 603 to perform example method 600.

In the illustrated example, the endpoint initializes VirtIO rings (block 602). For example, the endpoint 302 may initialize an available VirtIO ring 601 and a used VirtIO ring 603. The available VirtIO ring 601 and the used VirtIO ring 603 may be separate rings or may be a shared ring. Additional available VirtIO rings 601 and used VirtIO rings 603 may already be initialized and existing as part of the VirtIO ring pool 605. Then, the available VirtIO ring 601 and the used VirtIO ring 603 are initialized and part of the VirtIO ring pool 605 (blocks 604 and 606). For example, the ring pool 605 may include rings from multiple endpoints 302. In another example, the ring pool 605 may be associated with a specific endpoint 302 or subset of endpoints 302.

After initializing the VirtIO rings (e.g., available VirtIO ring 601 and used VirtIO ring 603), the endpoint 302 stores a packet address 610 (e.g., packet address "P_1") of an Ethernet packet in the available VirtIO ring 601 (block 608). Typically, the endpoint 302 may store a packet address ("P_1") in the available VirtIO ring 601 by writing the packet address into a slot in the ring. In some instances, the slot may have been a previously used slot that is now reusable and the endpoint 302 may overwrite an existing memory entry in the VirtIO ring 601.

Then, the packet address 610 (e.g., packet address "P_1") is stored in the available VirtIO ring 601 (block 612). It should be appreciated that other data may be stored in the available VirtIO ring 601 such as a request or other memory entries.

The gateway 102 polls the VirtIO ring pool 605 (block 614). For example, the gateway 102 may periodically poll the VirtIO ring pool 605 at a predetermined interval. The gateway 102 may poll all active VirtIO rings 601 periodically (e.g., all active VirtIO rings 601) from each of the endpoints 302 in communication with the gateway 102. In other examples, the gateway 102 may poll active VirtIO rings 601 associated with endpoints 302 that the gateway 102 communicates with regularly and otherwise may wait for an instruction or notification from a different endpoint 302 that a new memory entry is available for transmission. The gateway 102 may establish criteria to determine which endpoints 302 to periodically poll. For example, as some endpoints 302 increase networking traffic, those endpoints 302 may replace less active endpoints 302 on the active polling list. In other cases, endpoints 302 that have become idle may be removed from the active polling list.

Then, the gateway 102 detects that a new available VirtIO ring 601 is active (block 616). Specifically, the gateway 102 detects that the endpoint 302 has initialized a new available VirtIO ring 601 in the VirtIO ring pool 605. In an example, the gateway may detect that an available VirtIO ring 601 is active before the endpoint 302 stores an Ethernet packet in the available VirtIO ring 601.

The endpoint 302 notifies the gateway 102 to transmit the Ethernet packet (block 618). For example, the endpoint 302 may send a notification 620, such as a "SEND" notification or request to the gateway 102. Then, the gateway 102 receives the notification 620 (e.g., "SEND" notification) from the endpoint 302 (block 622). In other examples, the gateway 102 may automatically detect the Ethernet packet by polling the available VirtIO ring 601 associated with the endpoint 302 and further notifications from the endpoint 302 to the gateway 102 are unnecessary.

The gateway 102 issues an RDMA read request to access the available VirtIO ring 601 (block 624). Specifically, the gateway can access the available VirtIO rings 601 using RDMA read and may access the used VirtIO rings 603 using RDMA write. After accessing the available VirtIO ring 601, the gateway 102 reads the packet address 610 (e.g., packet address "P_1") and retrieves the Ethernet packet (block 626). The gateway 102 may access the packet address 610 and copy the data packet from that memory location identified by the packet address 610, which may be a memory location other than that of the VirtIO rings 601, 603.

After retrieving the Ethernet packet, the gateway 102 writes the packet address 630 (e.g., packet address "P_1") of the Ethernet packet into the used VirtIO ring 603 (block 628). Now, the packet address 630 is stored in the used VirtIO ring 603 (block 632). For example, the gateway 102 writes the packet address 630 (e.g., packet address "P_1") into the used VirtIO ring 603 to indicate that the memory associated with the Ethernet packet can be reused by the endpoint 302. Writing the packet address 630 or setting a flag in the used VirtIO ring 603 may indicate to the endpoint 302 that the packet has been sent or is in the processes of being transmitted The gateway 102 may also forward the Ethernet packet on an external network (block 634). For example, the Ethernet packet may be forwarded on an external network to another computer or machine by using RDMA even if both of the communication parties are not RDMA-aware.

After forwarding the Ethernet packet, the gateway 102 notifies the endpoint 302 that the Ethernet packet (e.g., packet associated with packet address "P_1") was sent (block 636). For example, the gateway 102 may send a notification 638, such as a "SEND" notification or request to the endpoint 302. Then, the endpoint 302 receives the notification 638 (e.g., "SEND" notification) from the gateway 102 (block 640). After receiving the notification, the endpoint 302 may store a different packet or a new packet in the memory location previously identified by packet address "P_1." Once a new packet is ready for transmission, the endpoint 302 may store a packet address or set a flag in the available VirtIO ring 601 to indicate that a new packet is available.

As illustrated in FIG. 6B, the endpoint 302 stores a packet address 644 (e.g., packet address "P_2") of an Ethernet packet in the available VirtIO ring 601 (block 642). The endpoint 302 may store a packet address ("P_1") in the available VirtIO ring 601 by writing the packet address into a slot in the ring. Then, the packet address 644 (e.g., packet address "P_2") is stored in the available VirtIO ring 601 (block 646).

The endpoint 302 notifies the gateway 102 to transmit the Ethernet packet (block 648). For example, the endpoint 302 may send a notification 650, such as a "SEND" notification or request to the gateway 102. Then, the gateway 102 receives the notification 650 (e.g., "SEND" notification) from the endpoint 302 (block 652). Then, the gateway 102 issues an RDMA read request to access the available VirtIO ring 601 (block 654). After accessing the available VirtIO ring 601, the gateway 102 reads the packet address 644 (e.g., packet address "P_2") and retrieves the Ethernet packet (block 656).

After retrieving the Ethernet packet, the gateway 102 writes the packet address 660 (e.g., packet address "P_2") of the Ethernet packet into the used VirtIO ring 603 (block 658). Now, the packet address 660 is stored in the used VirtIO ring 603 (block 662). For example, the gateway 102 writes the packet address 660 (e.g., packet address "P_2") into the used VirtIO ring 603 to indicate that the memory associated with the Ethernet packet can be reused by the endpoint 302. In the scenarios where the available VirtIO ring 601 and the used VirtIO ring 603 are a shared ring or the same ring, the gateway 102 may indicate that memory may be reused by invalidating a slot or writing a NULL value into the slot.

The gateway 102 may also forward the Ethernet packet on an external network (block 664). In an example, the gateway 102 may forward the Ethernet packets (e.g., Ethernet packets associated with packet addresses "P_1" and "P_2") in batches such that both packets are forwarded at block 664.

At some point in time, the endpoint 302 may become idle (block 668). For example, the endpoint 302 may cease initializing new rings in the VirtIO ring pool 605 or may cease storing packet addresses in the available VirtIO rings 601 in the ring pool 605.

Then, the gateway 102 detects that the endpoint 302 has become idle (block 670). Specifically, the gateway 102 may be configured to detect a state of the endpoint, such as detecting when an endpoint 302 becomes idle or when an endpoint 302 once again becomes active. After detecting that the endpoint 302 is idle, the gateway 102 stops polling the endpoint 302 or the VirtIO rings associated with the endpoint 302 (e.g., available VirtIO ring 301 in VirtIO ring pool 605). Instead of periodically polling the VirtIO ring pool 605 at a predetermined intervals, the gateway may stop polling all together to conserve system resources.

After an endpoint 302 becomes idle, the gateway 102 may enable notifications on the endpoint 302 such that the endpoint 302 can notify the gateway 102 when the endpoint 302 wakes up and becomes active. Additionally, the gateway 102 may wake up an idle endpoint 302 by using a "SEND" notification or message. Each message causes additional overhead and the systems and methods described herein may utilize notification suppression structures to temporarily disable notifications. For example, after the gateway 102 is actively polling or currently reading VirtIO rings 601 associated with an endpoint, notifications from that endpoint 302 may be disabled to reduce overhead. The gateway 102 may write the notification suppression structure into the available VirtIO ring 601 to suppress notifications.

Once active polling is stopped for an endpoint 302, notifications may be enabled again so that the endpoint 302 can notify the gateway 102 when additional data is available for transmission over the external network.

Figure 7:
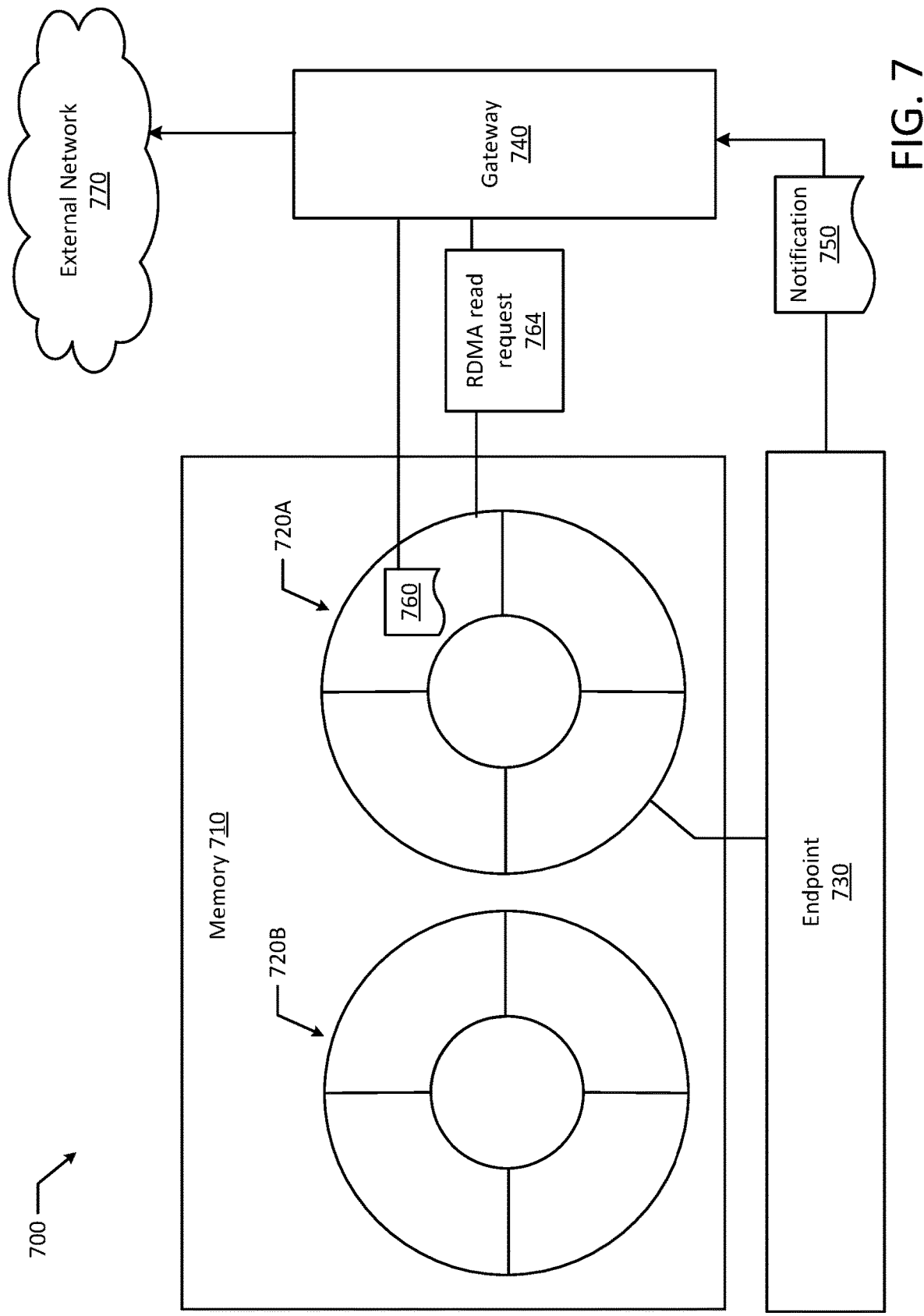
FIG. 7 illustrates a block diagram of an example RDMA based networking gateway system according to an example embodiment of the present disclosure.

FIG. 7 is a block diagram of an example RDMA based networking gateway system 700 according to an example of the present disclosure. The RDMA based networking gateway system 700 includes a memory 710 including a plurality of rings 720A-B, an endpoint 730 associated with a ring 720A of the plurality of rings 720A-B, and a gateway 740. The gateway 740 is configured to receive a notification 750 from the endpoint 730 regarding a packet 760 made available in the ring 720A associated with the endpoint 730. The gateway 740 is also configured to access the ring 720A with an RDMA read request 764. Additionally, the gateway 740 is configured to retrieve the packet 760 made available in the ring 720A and forward the packet 760 on an external network 770.

Instead requiring each communicating party to be RDMA-aware, communicating parties may use Ethernet protocols by modifying an Ethernet driver (e.g., VirtIO Ethernet driver) to support RDMA so that various endpoints 302 can transmit data through a gateway 102 over an external network. The systems and methods described above works with both virtual machines and containers without having to specifically program applications to communicate via RDMA. Instead, the applications can interact with a VirtIO Ethernet driver as they otherwise normally would when sending and receiving data, which allows containers and virtual machines to use RDMA transparently based on a familiar VirtIO Ethernet driver.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory including a plurality of rings, an endpoint associated with a ring of the plurality of rings, and a gateway. The gateway is configured to receive a notification from the endpoint regarding a packet made available in the ring associated with the endpoint, access the ring with an RDMA read request, retrieve the packet made available in the ring, and forward the packet on an external network.

In a 2nd exemplary aspect of the present disclosure, which may be used in combination with any one or more of the preceding aspects (e.g., the 1st aspect), the rings are virtIO rings and the endpoint is configured to store the packet in a slot of the ring associated with the endpoint.

In a 3rd exemplary aspect of the present disclosure, which may be used in combination with any one or more of the preceding aspects (e.g., the 1st aspect), the gateway is further configured to write the packet into the ring to notify the endpoint that packet has been transferred.

In a 4th exemplary aspect of the present disclosure, which may be used in combination with any one or more of the preceding aspects (e.g., the 3rd aspect), the endpoint is configured to store a different packet in the slot responsive to receiving a notification that the packet has been transferred.

In a 5th exemplary aspect of the present disclosure, which may be used in combination with any one or more of the preceding aspects (e.g., the 1st aspect), the gateway is further configured to detect a state of the endpoint.

In a 6th exemplary aspect of the present disclosure, which may be used in combination with any one or more of the preceding aspects (e.g., the 5th aspect), the state is an idle state.

In a 7th exemplary aspect of the present disclosure, which may be used in combination with any one or more of the preceding aspects (e.g., the 6th aspect), responsive to detecting that the endpoint is in the idle state, the gateway is configured to enable notifications on the endpoint.

In an 8th exemplary aspect of the present disclosure, which may be used in combination with any one or more of the preceding aspects (e.g., the 6th aspect), responsive to detecting that the endpoint is in the idle state, the gateway is configured to stop polling the available ring associated with the endpoint.

In a 9th exemplary aspect of the present disclosure, which may be used in combination with any one or more of the preceding aspects (e.g., the 6th aspect), the gateway is further configured to wake up the endpoint in the idle state.

In a 10th exemplary aspect of the present disclosure, which may be used in combination with any one or more of the preceding aspects (e.g., the 9th aspect), waking up the endpoint includes sending a message to the endpoint.

In an 11th exemplary aspect of the present disclosure, which may be used in combination with any one or more of the preceding aspects (e.g., the 1st aspect), the gateway is configured to poll the plurality of rings.

In a 12th exemplary aspect of the present disclosure, which may be used in combination with any one or more of the preceding aspects (e.g., the 11th aspect), the gateway is configured to poll a subset of the plurality of rings.

In a 13th exemplary aspect of the present disclosure, which may be used in combination with any one or more of the preceding aspects (e.g., the 1st aspect), the endpoint is configured to initialize the ring.

Aspects of the subject matter described herein may be useful alone or in combination with one or more other aspects described herein. In a 14th exemplary aspect of the present disclosure, a method includes receiving, by a gateway, a notification from an endpoint regarding a packet made available in a ring associated with an endpoint. The gateway accesses the ring with an RDMA read request and retrieves the packet made available in the ring. Additionally, the gateway forwards the packet on an external network.

In a 15th exemplary aspect of the present disclosure, which may be used in combination with any one or more of the preceding aspects (e.g., the 14th aspect), the method also includes storing, by the endpoint, the packet in a slot of the ring, wherein the ring is an available virtIO ring.

In a 16th exemplary aspect of the present disclosure, which may be used in combination with any one or more of the preceding aspects (e.g., the 15th aspect), the method further includes writing, by the gateway, the packet into a used virtIO ring to notify the endpoint that packet in the slot has been transferred.

In a 17th exemplary aspect of the present disclosure, which may be used in combination with any one or more of the preceding aspects (e.g., the 16th aspect), the method further includes storing, by the endpoint, a different packet in the slot.

In an 18th exemplary aspect of the present disclosure, which may be used in combination with any one or more of the preceding aspects (e.g., the 14th aspect), the method further includes detecting, by the gateway, a state of the endpoint.

In a 19th exemplary aspect of the present disclosure, which may be used in combination with any one or more of the preceding aspects (e.g., the 18th aspect), the state is an idle state.

In a 20th exemplary aspect of the present disclosure, which may be used in combination with any one or more of the preceding aspects (e.g., the 19th aspect), the method further includes responsive to detecting that the endpoint is in an idle state, enabling, by the gateway, notifications on the gateway.

In a 21st exemplary aspect of the present disclosure, which may be used in combination with any one or more of the preceding aspects (e.g., the 19th aspect), the method further includes responsive to detecting that the endpoint is in an idle state, stopping, by the gateway, polling the ring associated with the endpoint.

In a 22nd exemplary aspect of the present disclosure, which may be used in combination with any one or more of the preceding aspects (e.g., the 19th aspect), the method of claim 19, further includes waking up, by the gateway, the endpoint in the idle state.

In a 23rd exemplary aspect of the present disclosure, which may be used in combination with any one or more of the preceding aspects (e.g., the 22nd aspect), waking up the endpoint includes sending a message to the endpoint.

In a 24th exemplary aspect of the present disclosure, which may be used in combination with any one or more of the preceding aspects (e.g., the 14th aspect), the method further includes polling, by the gateway, the ring associated with the endpoint.

Aspects of the subject matter described herein may be useful alone or in combination with one or more other aspects described herein. In a 25th exemplary aspect of the present disclosure, a non-transitory machine-readable medium stores code, which when executed by a gateway, is configured to receive a notification from an endpoint regarding a packet made available in a ring associated with the endpoint. The non-transitory machine-readable medium is also configured to access the ring with an RDMA read request, retrieve the packet made available in the ring, and forward the packet on an external network.

Aspects of the subject matter described herein may be useful alone or in combination with one or more other aspects described herein. In a 26th exemplary aspect of the present disclosure, a system includes a means for receiving a notification from an endpoint regarding a packet in a ring associated with the endpoint. The system also includes a means for accessing the ring with an RDMA read request, a means for retrieving the packet made available in the ring, and a means for forwarding the packet on an external network.

Aspects of the subject matter described herein may be useful alone or in combination with one or more other aspects described herein. In a 27th exemplary aspect of the present disclosure, a system includes a memory including a plurality of rings, an endpoint associated with a ring of the plurality of rings, and a gateway. The gateway is configured to receive a packet address of a packet, locate the endpoint associated with the packet based on destination address information in the packet, and issue an RDMA read request to the endpoint to retrieve the packet made available in a slot in the ring at the endpoint. The gateway is also configured to temporarily storing the packet at the gateway, and issue an RDMA write request to indicate that the slot can be reused.

In a 28th exemplary aspect of the present disclosure, which may be used in combination with any one or more of the preceding aspects (e.g., the 27th aspect), the rings are virtIO rings.

In a 29th exemplary aspect of the present disclosure, which may be used in combination with any one or more of the preceding aspects (e.g., the 27th aspect), the destination address information is stored in a packet header.

In a 30th exemplary aspect of the present disclosure, which may be used in combination with any one or more of the preceding aspects (e.g., the 27th aspect), the endpoint address is a MAC address.

In a 31st exemplary aspect of the present disclosure, which may be used in combination with any one or more of the preceding aspects (e.g., the 27th aspect), the gateway is further configured to notify the endpoint that the packet has been sent.

In a 32nd exemplary aspect of the present disclosure, which may be used in combination with any one or more of the preceding aspects (e.g., the 31st aspect), notifying the endpoint includes issuing, by the gateway, a SEND message to the endpoint.

In a 33rd exemplary aspect of the present disclosure, which may be used in combination with any one or more of the preceding aspects (e.g., the 27th aspect), the system further includes a second endpoint. Each endpoint is assigned a unique MAC address or MAC layer.

Aspects of the subject matter described herein may be useful alone or in combination with one or more other aspects described herein. In a 34th exemplary aspect of the present disclosure, a method includes receiving, by a gateway, a packet address of a packet. The gateway locates an endpoint associated with the packet based on destination address information in the packet, and issues an RDMA read request to the endpoint to retrieve the packet made available in a slot in a ring at the endpoint. The gateway also temporarily stores the packet at the gateway, and issues an RDMA write request to indicate that the slot can be reused.

In a 35th exemplary aspect of the present disclosure, which may be used in combination with any one or more of the preceding aspects (e.g., the 34th aspect), the rings are virtIO rings.

In a 36th exemplary aspect of the present disclosure, which may be used in combination with any one or more of the preceding aspects (e.g., the 34th aspect), the destination address information is stored in a packet header.

In a 37th exemplary aspect of the present disclosure, which may be used in combination with any one or more of the preceding aspects (e.g., the 34th aspect), the endpoint address is a MAC address.

In a 38th exemplary aspect of the present disclosure, which may be used in combination with any one or more of the preceding aspects (e.g., the 34th aspect), the RDMA read request is issued to a used virtIO ring.

In a 39th exemplary aspect of the present disclosure, which may be used in combination with any one or more of the preceding aspects (e.g., the 34st aspect), the method further includes, notifying, by the gateway, the endpoint that the packet has been sent.

In a 40th exemplary aspect of the present disclosure, which may be used in combination with any one or more of the preceding aspects (e.g., the 39th aspect), notifying the endpoint includes issuing, by the gateway, a SEND message to the endpoint.

Aspects of the subject matter described herein may be useful alone or in combination with one or more other aspects described herein. In a 41st exemplary aspect of the present disclosure, a non-transitory machine-readable medium stores code, which when executed by a gateway, is configured to receive a packet address of a packet and locate an endpoint associated with the packet based on destination address information in the packet. The non-transitory machine-readable medium is also configured to issue an RDMA read request to the endpoint to retrieve the packet made available in a slot in a ring at the endpoint, temporarily store the packet at the gateway, and issue an RDMA write request to indicate that the slot can be reused.

Aspects of the subject matter described herein may be useful alone or in combination with one or more other aspects described herein. In a 42nd exemplary aspect of the present disclosure, a system includes a means for receiving a packet address of a packet, a means for locating an endpoint associated with the packet based on destination address information in the packet, and a first means for issuing an RDMA read request to the endpoint to retrieve the packet made available in a slot in a ring at the endpoint. The system also includes a means for temporarily storing the packet at the gateway, and a second means for issuing, by the gateway, an RDMA write request to indicate that the slot can be reused.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory including a plurality of rings;
an endpoint associated with a ring of the plurality of rings; and
a gateway configured to:
receive a notification from the endpoint regarding a packet made available in the ring associated with the endpoint,
access the ring with an RDMA read request,
retrieve the packet made available in the ring,
forward the packet on an external network,
write the packet into the ring, and
send a notification to the endpoint indicating that the packet has been transferred.

2. The system of claim 1, wherein the plurality of rings are virtIO rings, and the endpoint is configured to store the packet in a slot of the ring associated with the endpoint.

3. The system of claim 1, wherein the endpoint is configured to store a different packet in a slot of the ring associated with the endpoint responsive to receiving the notification that the packet has been transferred.

4. The system of claim 1, wherein the gateway is further configured to detect a state of the endpoint, wherein the state is an idle state.

5. The system of claim 4, wherein responsive to detecting that the endpoint is in the idle state, the gateway is configured to enable notifications on the endpoint.

6. The system of claim 4, wherein responsive to detecting that the endpoint is in the idle state, the gateway is configured to stop polling the ring associated with the endpoint.

7. The system of claim 4, wherein the gateway is further configured to wake up the endpoint in the idle state.

8. The system of claim 1, wherein the gateway is configured to poll the plurality of rings.

9. The system of claim 1, wherein the endpoint is configured to initialize the ring.

10. A method comprising:
receiving, by a gateway, a notification from an endpoint regarding a packet made available in a ring associated with an endpoint;
accessing, by the gateway, the ring with an RDMA read request;
retrieving, by the gateway, the packet made available in the ring;
forwarding, by the gateway, the packet on an external network; and
detecting, by the gateway, a state of the endpoint, wherein the state is an idle state.

11. The method of claim 10, further comprising storing, by the endpoint, the packet in a slot of the ring, and wherein the ring is an available virtIO ring.

12. The method of claim 11, further comprising writing, by the gateway, the packet into a used virtIO ring.

13. A method comprising:
receiving, by a gateway, a packet address of a packet;
locating, by the gateway, an endpoint associated with the packet based on destination address information in the packet;
issuing, by the gateway, an RDMA read request to the endpoint to retrieve the packet made available in a slot in a ring at the endpoint;
temporarily storing, by the gateway, the packet at the gateway; and
issuing, by the gateway, an RDMA write request to indicate that the slot can be reused.

14. The method of claim 13, wherein the ring is a virtIO ring.

15. The method of claim 13, wherein the destination address information is stored in a packet header.

16. The method of claim 13, wherein the endpoint has an endpoint address associated with the destination address information, and wherein the endpoint address is a MAC address.

17. The method of claim 13, wherein the RDMA read request is issued to a used virtIO ring.

18. The method of claim 13, further comprising, notifying, by the gateway, the endpoint that the packet has been sent.

19. The method of claim 18, wherein notifying the endpoint includes issuing, by the gateway, a SEND message to the endpoint.

\* \* \* \* \*